March 15, 1966  CHOH HSIEN LI  3,240,076
CONTROL APPARATUS
Filed Sept. 13, 1961
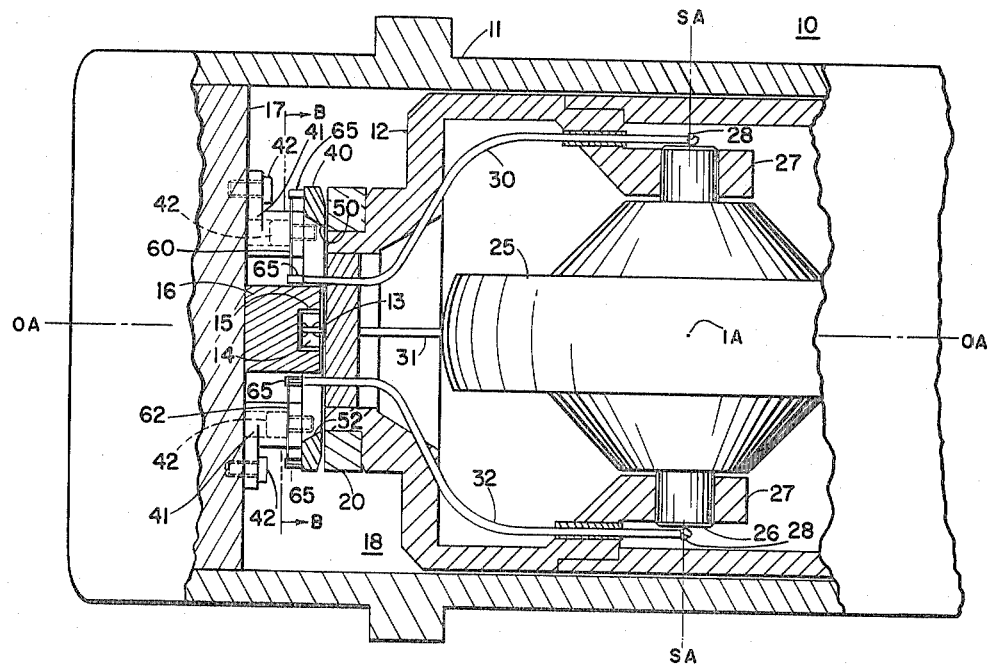
FIG. 1
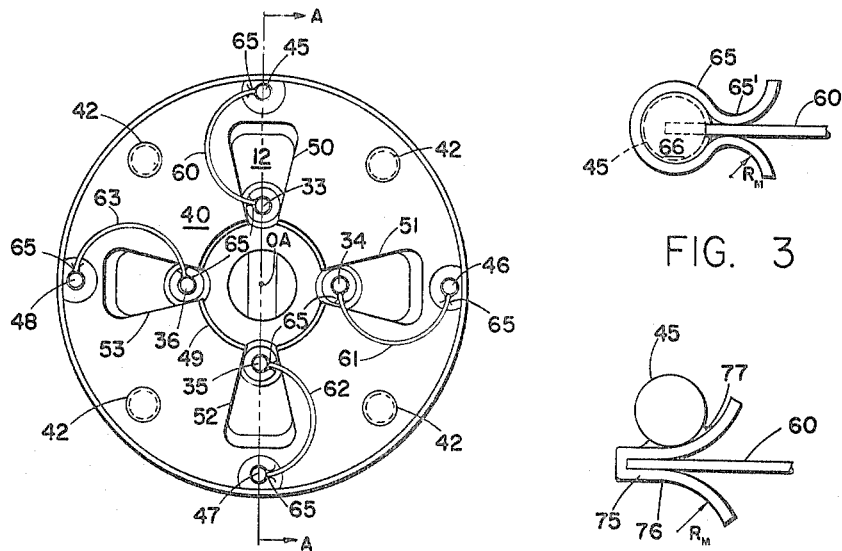
FIG. 2
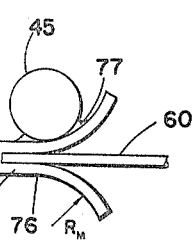
FIG. 3
FIG. 4
INVENTOR.
CHOH HSIEN LI
BY Roger W. Jensen
ATTORNEY

United States Patent Office 3,240,076
Patented Mar. 15, 1966

3,240,076
CONTROL APPARATUS
Choh Hsien Li, Hopkins, Minn., assignor to Honeywell Inc., a corporation of Delaware
Filed Sept. 13, 1961, Ser. No. 137,799
6 Claims. (Cl. 74—5.7)

This invention relates to sensitive instruments, and more particluarly to means for increasing the accuracy thereof. Present day requirements have necessitated vast improvements in the accuracy and sensitivity of all inertial type sensitive instruments. Generally inertial type sensitive instruments comprise a gimbal member mounted upon a housing member for substantially unrestrained, limited rotation therebetween. It is normally necessary to conduct electric energy between the relatively rotatable members without imparting restraint to the rotation therebetween. This is an extremely difficult task to accomplish. The generally accepted practice for conducting current between two relatively rotatable members in which limited rotation is realized is the utilization of flexible leads or conductors normally referred to as "flex leads." The flexible leads consist of extremely small (in one case .04 inch by .0003 inch in cross section) conductors fabricated from such materials as a silver-copper alloy. The flexible leads have sufficient length to allow limited rotation between the gimbal member and the housing member. However, the utilization of these flexible leads substantially affects the accuracy of the sensitive instrument.

The effect of the utilization of the flexible leads upon the accuracy of the sensitive instrument is more easily understood with reference to a specific instrument. A sensitive floated integrating gyroscope is an excellent example.

The sensitive floated integrating gyroscope, hereinafter referred to as gyro, comprises basically an electrically driven rotor element mounted for rotation about a spin axis (SA). The rotor is mounted within a gimbal element, which in turn is mounted for limited rotation about an output axis (OA) within a gyro housing means. The gyro housing is filled with a viscous fluid which substantially supports the gimbal element. The power to drive the rotor element is conduced from the stationary gyro housing to the rotatable gimbal element (and rotor) by means of the flexible conductors or "flex leads."

An input rate to the gyro results in the precession of the gimbal element about the OA relative to the housing element. The amount of rotation of the gimbal element about the OA is indicative of the input and provides a useful output signal.

Errors in the gyro result from various torques acting upon the gimbal element causing the rotation thereof about the OA. Generally these error producing torques are divided into two categories: non-acceleration sensitive torques and acceleration sensitive torques. An example of an acceleration sensitive torque is the torque applied to the gimbal element about the OA due to the unbalance thereof. The non-acceleration sensitive error producing torques include torques due to pickoff and torquer magnetics, flexible lead torques, and spin motor reaction torques. The great percentage of the total non-acceleration sensitive error torques in the gyro is attributed to shifts in the magnitude of the torque applied to the gimbal by the flexible leads. It should be pointed out that should these non-acceleration sensitive error torques be constant throughout the operating environment of the gyroscope, they could be compensated for and would present little difficulty. However, in operation, these non-acceleration sensitive error torques are not constant throughout the operating environment of the gyro and consequently result in erroneous output signals from the gyroscope.

This invention is based on the discovery that the shift in the torque applied to the gimbal by the flexible leads (which amounts for the great percentage of the total non-acceleration sensitive error producing torques) is the resultant of the interaction of the viscous fluid and the flexible leads during low temperature conditions.

An exhaustive investigation of the "flex leads" torque shift by the applicant has disclosed that at low temperature conditions (approximately —20° F. and lower) the viscous fluid tends to solidify and apply a force to the flexible leads, at the point of attachment to the terminals, sufficient to exceed the elastic limit of the flexible leads. This results in a permanent set or strain in the flexible leads with a resulting increase in length. This increase in length in the flexible leads results in the application of a torque to the gimbal element about the output axis (OA) which is of different magnitude than originally and results in an erroneous signal being generated by the gyroscope. The applicant has solved this problem and obtained a significant increase in accuracy by providing means for limiting the deflection of the flexible leads proximate the point of attachment to the terminals.

It is therefore an object of this invention to provide a significant improvement in the accuracy of sensitive instruments having relatively rotatable members by the reduction of the non-acceleration sensitive torques acting thereon.

Other objects of the invention will become apparent from a study of the accompanying specification and claims in conjunction with the single sheet of drawing in which:

FIGURE 1 is a partial cross-sectional view taken along section line A—A of FIGURE 2 of a sensitive floated integrating gyroscope or gyro utilizing the applicant's invention;

FIGURE 2 is a cross-sectional view taken along section line B—B of FIGURE 1;

FIGURE 3 is an enlarged representation of means of limiting the deflection of the flexible conductors; and FIGURE 4 is an enlarged representation of another means of limiting the deflection of the flexible conductors.

With reference now to FIGURE 1, reference numeral 10 generally depicts a gyro. A generally cylindrically shaped housing member is identified by reference numeral 11. A generally cylindrically shaped gimbal element 12 is mounted within housing member 11 for limited rotation therebetween. The gimbal element 12 is mounted for limited rotation by means of a tapered pivot element 13 which is rigidly attached to the gimbal element 12 and cooperates with a jewel element 14 which is positioned within a recess 15 in a boss member 16. Member 16 is rigidly attached to an end member 17 which is rigidly attached to the housing element 11. The housing element 11 is filled with a viscous fluid 18 which substantially supports gimbal element 12 so as to reduce the load on the pivot element 13 and the jewel element 14. In addition, the fluid 18 performs an integrating function. A similar bearing means is provided on the opposite end of the gimbal element 12, however the second bearing means is not illustrated in FIGURE 1. The two bearing means define the output axis of the gyro which is identified by the symbol OA in FIGURE 1. The OA of the gyro is perpendicular to the spin axis for the rotor which is identified by the symbol SA in FIGURE 1. The input axis IA of the gyro is mutually perpendicular to the OA and the SA and is perpendicular to the plane of FIGURE 1. An input rate about the IA results in rotation of the gimbal element 12 about the OA relative to the housing member 11 as a result of the precession of the gyro rotor.

In order to detect the rotation of the gimbal element 12 about the OA, suitable pickoff means are provided. Any suitable type of pickoff means for detecting the relative rotation between the gimbal element 12 and the housing member 11 may be utilized. Generally an inductive type pickoff means is provided in which an armature element 20 is attached to the gimbal element 12 and rotates therewith. Suitable primary and secondary windings (not shown) cooperate with the armature element in the usual manner so as to produce an output signal upon relative movement therebetween. It will be understood that the primary and secondary windings are rigidly attached to the housing member 11.

A torque generator (not shown) is also provided in the gyro. The function of the torque generator is to apply a torque to the gimbal element 12 about the OA, tending to return the gimbal element 12 to its original or null position relative to the housing element 11. One method of providing the necessary torque generator is to combine it with the signal generator in a device commonly known as the "dualsyn." The functioning of the "dualsyn" is well known in the art and forms no particular part of the present invention, consequently no further discussion of the "dualsyn" is deemed necessary here.

A gyro rotor 25 is rotatably mounted by suitable bearing means (not shown) upon a rotor shaft 26. Rotor shaft 26 is suitably mounted within gimbal element 12 by means of a pair of suitable extension elements 27. The axis of the rotor shaft 26 defines the spin axis SA of the rotor 25. The rotor element 25 is actually the armature member of an inside-out electric motor. Rotor 25 is caused to rotate when the motor windings are energized from a suitable power source. The details of the motor windings are not disclosed in FIGURE 1, however gyro rotors of this particular type are well known in the art and no further description is deemed necessary. The motor windings are energized through a plurality of motor leads 30, 31 and 32. As viewed in FIGURE 1, the motor leads extend from the terminals 28 on rotor shaft 26 to a position slightly beyond the left extremity of the gimbal element 12. The portions of the motor leads extending beyond the gimbal element 12 are identified as terminals 33, 34, 35 and 36, and are aligned in substantially parallel relationship (FIGURE 2).

A baffle plate 40 of generally cylindrical shape is rigidly attached to member 17 and thus to housing 11 by means of a plurality of brackets 41 and a plurality of screws 42. It should be noted that baffle plate 40 is rigidly attached to the housing element 11 and that gimbal element 12 rotates relative thereto.

Baffle plate 40 is more clearly illustrated in FIGURE 2 in which it is shown in a plan view. Baffle plate 40 has a plurality of terminals located thereon around the periphery thereof which are identified by reference numerals 45, 46, 47 and 48. Terminals 45-48 are substantially the same diameter and dimension as terminals 33-36. It will be noted that baffle plate 40 has a circular central aperture 49 therethrough. In addition, a plurality of wedge-shaped openings 50, 51, 52 and 53 are contained therein. The wedge-shaped openings are symmetrically positioned about the OA with the wider portion of the opening extending radially outwardly towards the terminals 45-48. The narrow portion of the wedge-shaped openings intersect aperture 49. The function of the wedge-shaped openings 50 through 53 is to allow the terminals 33-36 to extend through baffle plate 40 as is clearly illustrated in FIGURE 1.

The flexible leads, conductors, current carrying means, or "flex leads" are identified in FIGURE 2 by reference numerals 60, 61, 62 and 63. It will be noted that the flexible conductors 60-63 electrically connect terminals 45-48 to terminals 33-36 respectively. The flexible leads 60-63 are of sufficient longitudinal extent so as to allow limited rotation between gimbal element 12 and housing member 11. Stated otherwise, the length of the flexible leads is somewhat greater than the distance between the two terminals to be connected. Consequently, the flexible leads assume a generally C shape between the terminals. This allows limited rotation of the gimbal element relative to the housing. The "flex leads" 60-63 are soldered to terminals 33-36 and to terminals 45-48 so as to electrically connect the terminals.

In addition, means are provided to limit the deflection of the flexible conductors proximate the terminals 45-48 and 33-36. One means of limiting the deflection of the flexible conductors is the utilization of a plurality of terminal clips 65. An enlarged view of one terminal clip 65 is illustrated in FIGURE 3. The terminal clip 65 has a generally U-shaped cross section with a portion 65' of the arms of the U being closer together than the bight of the U; the arms of the U then flare radially outward along a predetermined radius $R_m$.

In practice, the flexible conductor e.g. 60, is set upon the top of the terminal, 45. The terminal clip 65 is positioned around the terminal 45 as shown in FIGURE 3. Terminal clip 65 substantially encircles terminal 45, and has a somewhat greater axial extent than terminal 45. The flex lead 60 is positioned between the portions 65' of clip 65 and is in contact with the end of terminal 45. A drop of solder 66 is placed over the top of flex lead 60 and terminal 45, electrically connecting them. Thus the flex lead 60 is firmly attached to the terminal 45 so that current may be conducted therebetween. It should be pointed out that each of the terminal and flex lead connections is identical to the above described connection.

The minimum radius of curvature $R_m$ of the flaring portion of the terminal clip 65 is determined by the following relationship: $R_m = E/S_{max} \times C$ where $R_m$ is the minimum (critical) radius of curvature of the flex leads. $E$ is Young's modulus for the particular flex lead material. $S_{max}$ is the elastic limit in tension of the particular material of the flex lead. $C$ is equal to one-half the thickness of the flex lead.

Now depending on the particular material and dimensions of the flex lead which is to be utilized in the sensitive instrument, the critical radius for this particular material is determined by the above formula. Clip 65 is fabricated with $R_m$ equal to this particular value as the minimum radius. The reason that this particular dimension is so critical is that deflection of the flex lead about a radius less than this critical radius causes overstressing of the flex lead and results in a permanent set or elongation in the flex lead. This increase in length in the flex lead results in a torque shift, that is to say, the flex lead now applies a different torque to the gimbal element 12 than originally. This results in the rotation of the gimbal element 12 about the OA. This rotation results in an erroneous signal being generated by the gyro. Normally, this deflecting and overstressing of the flex lead is encountered during low temperatures. As pointed out earlier, this torque shift due to overstressing of the flex leads results in erroneous output signals which exceed the accuracy demands of the present day sensitive instruments.

FIGURE 4 illustrates an alternate means for limiting the deflection of the flexible leads. The terminal clip 75 has a generally V-shaped cross section with the arms of the V flaring outwardly along a predetermined radius $R_m$. The radius is determined in the same manner as indicated with reference to FIGURE 3. The flexible lead, e.g. 60, is positioned between the two arms of the clip 75 and the clip is then spot welded together as at point 76. The clip 75 and flexible lead assembly is then soldered to the terminal e.g. 45, as illustrated by reference numeral 77. Terminal clip 75 performs the same function as terminal clip 65 in limiting the deflection of the flexible lead 60 and no further discussion is deemed necessary.

Heretofore, it was unknown as to what caused the non-acceleration sensitive torque shift in inertial type sensitive instruments. The applicant, through extensive research into this problem, has finally determined that it is the overstressing of the flex leads due to the action of the gyro fluid thereon at low temperatures. It seems that the flex lead is distorted throughout its longitudinal extent by the solidification of the fluid. However, since the lead is flexible except at its point of attachment to the terminals, the problem arises proximate the terminals. At the terminal connection the flex lead is relatively rigid and is overstressed by the action of the fluid thereupon at low temperatures. The applicant has eliminated this torque shift and obtained a substantial increase in the accuracy of the instrument by utilizing means of limiting the amount of deflection of the flex leads proximate the terminals.

The applicant has illustrated two preferred embodiments of limiting the deflection of the flexible leads, however there are other embodiments which will occur to those skilled in the art. The applicant desires to be understood that the invention is not limited to the particular embodiments illustrated. On the contrary, the applicant intends in the appended claims to cover all modifications which do not depart from the spirit or scope of the invention.

I claim:

1. In a sensitive instrument: a housing member having a first plurality of terminal elements attached thereto; a gimbal member mounted within said housing member for limited rotation therebetween; a second plurality of terminal elements attached to said gimbal element; fluid within said housing member surrounding said first and said second plurality of terminal elements; a plurality of flexible conductors each electrically connecting one of said first plurality of terminal elements to one of said second plurality of terminal elements, and means contiguous said first and said second plurality of terminal elements limiting the deflection of a portion of said flexible conductors proximate said terminal elements, the deflection being limited to a specified radius so that stress within said flexible conductors is less than the elastic limit thereof.

2. In a sensitive instrument: a housing member having a first plurality of terminal elements attached thereto; a gimbal member mounted within said housing member for limited rotation therebetween; a second plurality of terminal elements attached to said gimbal member; fluid within said housing member surrounding said terminal elements; a plurality of flexible conductors each connecting one of said first plurality of terminal elements to one of said second plurality of terminal elements, and means contiguous each of said terminal elements restricting the amount of movement of portions of said flexible conductors proximate said terminal elements, the movement being restricted to a specified amount so that the stress within said flexible conductors is less than the elastic limit thereof.

3. In a sensitive instrument: a housing member having a first plurality of terminal elements attached thereto; a gimbal member mounted within said housing member for limited rotation therebetween; a second plurality of terminal elements attached to said gimbal element; fluid surrounding said first and said second plurality of terminal elements; a plurality of flexible leads each electrically connecting one of said first plurality of terminal elements to one of said second plurality of terminal elements, and means limiting the deflection of said flexible conductors proximate said terminal elements to a specified radius.

4. In a sensitive instrument: a housing member having a first plurality of terminal elements attached thereto; a gimbal member mounted within said housing member for limited rotation therebetween; a second plurality of terminal elements attached to said gimbal member; a plurality of flexible conductors each electrically connecting one of said first plurality of terminal elements to one of said second plurality of terminal elements, and means contiguous each of said terminal elements for limiting the deflection of each end of said conductors proximate said terminal elements.

5. In a sensitive instrument: a first member having a first terminal element thereon; a second member mounted upon said first member for limited rotation therebetween, a second terminal element attached to said second member; viscous fluid surrounding said first and second terminal elements; current carrying means connecting said first and said second terminal elements; and means limiting the deflection of said current carrying means proximate said terminal elements to a specified radius.

6. In a sensitive instrument: a first member having a first terminal element thereon; a second member mounted upon said first member for limited rotation therebetween, a second terminal element attached to said second member; current carrying means connecting said first and said second terminal elements; and means limiting the deflection of said current carrying means proximate said first terminal element and said second terminal element.

References Cited by the Examiner

UNITED STATES PATENTS

| | | |
|---|---|---|
| 1,743,533 | 1/1930 | Davis. |
| 2,811,042 | 10/1957 | Kenyon. |
| 2,828,627 | 4/1958 | Gabrielson. |
| 2,859,623 | 11/1958 | Sedgfield. |
| 2,859,625 | 11/1958 | Bonnell. |
| 2,930,240 | 3/1960 | Rellensmann et al. |

BROUGHTON G. DURHAM, *Primary Examiner.*

T. W. SHEAR, *Assistant Examiner.*